United States Patent [19]

Claflin

[11] Patent Number: 4,841,897
[45] Date of Patent: Jun. 27, 1989

[54] MOBILE HABITABLE CONTAINER

[76] Inventor: David H. Claflin, 1115 Jackson Ave., Wauconda, Ill. 60084

[21] Appl. No.: 140,776

[22] Filed: Jan. 4, 1988

[51] Int. Cl.⁴ .......................... B63C 13/00; B60P 3/34
[52] U.S. Cl. .................................... 114/270; 114/123; 296/168; 52/745
[58] Field of Search ............... 114/270, 344, 283, 123, 114/353, 56, 63; 52/143, 745; 296/156, 168, 181

[56] References Cited

U.S. PATENT DOCUMENTS

| | | | |
|---|---|---|---|
| 2,904,849 | 9/1959 | Bergstrom | 296/23 |
| 3,116,949 | 1/1964 | Muse | 296/23 |
| 3,157,427 | 11/1964 | Reynolds | 296/168 |
| 3,719,244 | 3/1973 | Miller | 296/23 |
| 3,806,147 | 4/1974 | Hanson | 296/23 |
| 3,877,094 | 4/1975 | Kelley | 114/344 |
| 3,879,240 | 4/1975 | Wall | 296/156 |
| 4,048,685 | 9/1977 | Gail | 114/344 |
| 4,149,748 | 4/1979 | Tanner | 296/168 |
| 4,250,906 | 2/1981 | Rivier et al. | 296/168 |
| 4,729,595 | 3/1988 | Barber et al. | 296/168 |

Primary Examiner—Joseph F. Peters, Jr.
Assistant Examiner—Ed Swinehart
Attorney, Agent, or Firm—Mathew R. P. Perrone, Jr.

[57] ABSTRACT

A mobile habitable container is suitable for use as a houseboat or highway trailer with a land use only mode. The mobile habitable container can be moved over Class I, Class II or Class III highways without oversize permit when mobile and can be rotated 90° to provide the largest practical living space within legal highway limits.

34 Claims, 8 Drawing Sheets

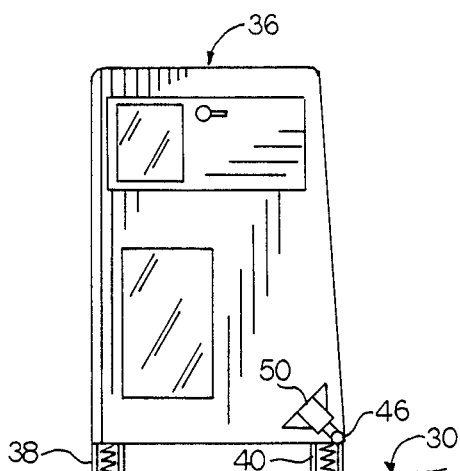
FIG. 7
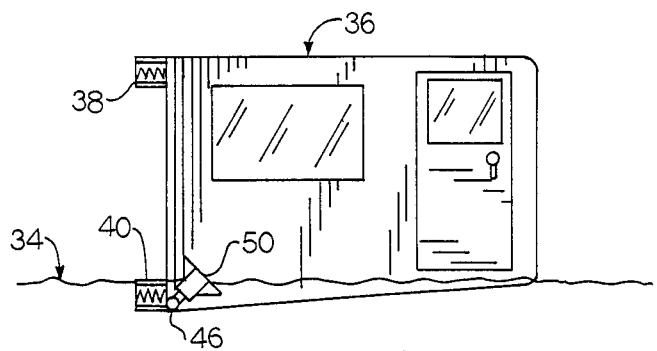
FIG. 8
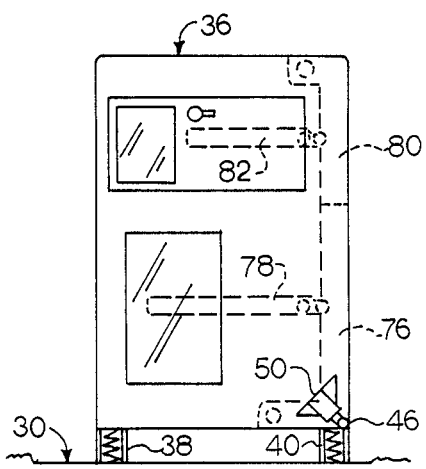
FIG. 9
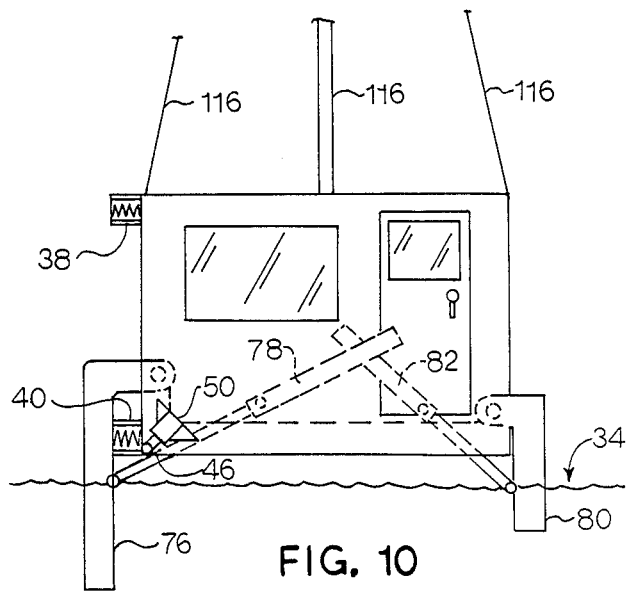
FIG. 10
FIG. 11
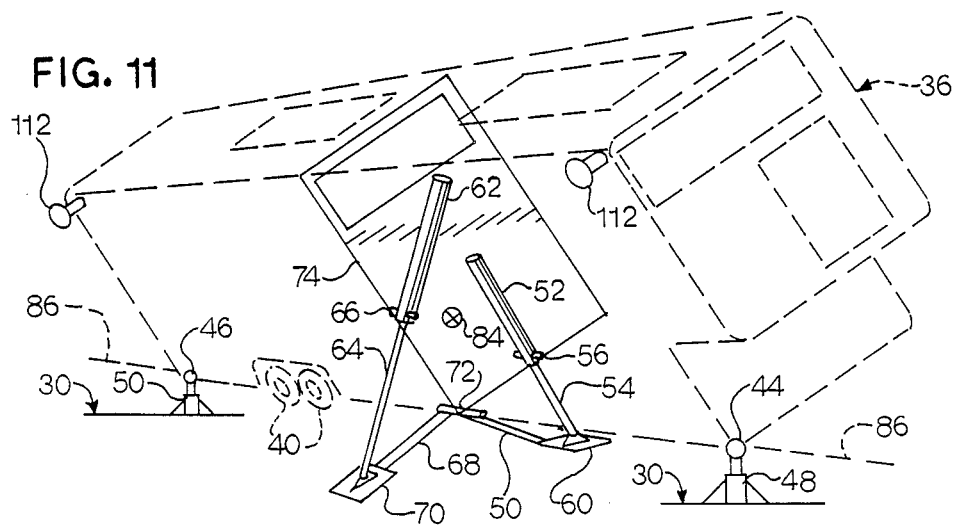

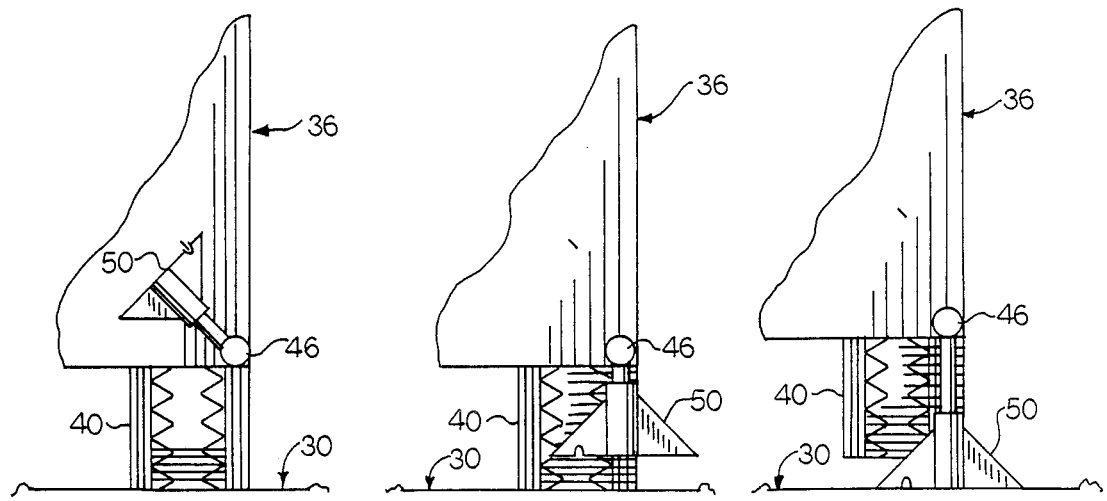
FIG. 21   FIG. 22   FIG. 23
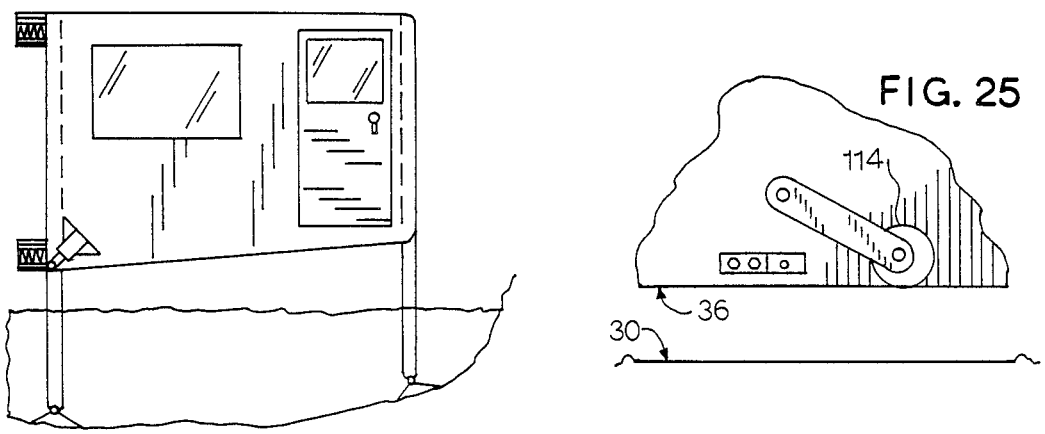
FIG. 24
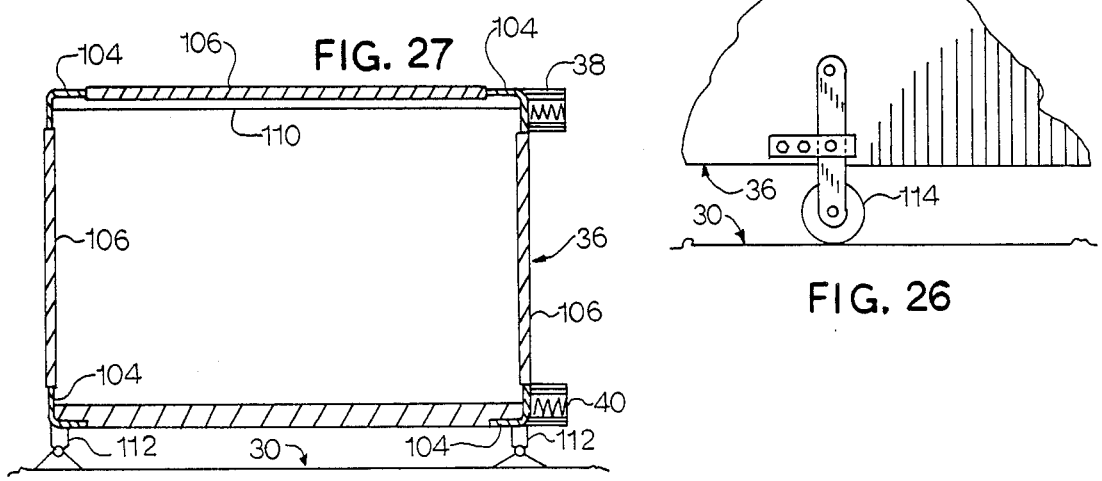
FIG. 25
FIG. 26
FIG. 27

MOBILE HABITABLE CONTAINER

BACKGROUND

1. Field of Invention.

This invention relates to mobile habitats, specifically a 13 foot 6 inch wide habitat that can be easily and safely towed at highway speeds on any roadway without the need for an oversize permit. The 1987 rules for Class I and II highways limit legal vehicle width to 8 feet 6 inches without an oversize permit while Class III roadways have an 8 foot 0 inch legal vehicle width limit requirement without an oversize permit. My "mobile habitable container" invention is designed to conform to these width restrictions in an unique manner which is what this patent is about.

BACKGROUND

2. Description of Prior Art.

Mobile habitats of several types exist. Some are narrow (8 feet wide), others are difficult and expensive to move and none are designed to be used equally well on both land and water.

A boat must be forty to fifty feet long before it has enough interior room to live in comfortably full time. Moving boats of this size long distances over land is costly. Boats also travel long distances on water but this can be dangerous and time consuming. Boats are generally restricted to water use.

Travel trailers and motor coaches cover long distances on highways easily and economically. However, they have an 8 foot 6 inch width restriction. This narrowness makes them generally unsuitable for continuous habitation and they are limited to land use.

Modern house trailers are 14 feet wide. This much width is necessary for comfortable continuous living but it makes them cumbersome on the highway. Special equipment and an oversize permit are required before moving them. House trailers are also limited to land use.

Private railroad cars can be luxurious and beautiful inside but they too are narrow (10 feet wide). They are limited to rail use and are too expensive for the average person.

My "mobile habitable container" is functional in two mutually exclusive modes which I will refer to throughout this patent application as the "highway trailer" mode and the "wide habitat" mode. I call the first mode the "highway trailer" mode because in this position the container conforms to all the dimensional and weight limit restrictions for legal use on Class I, II and III U.S. highways and can use all these roads without the need for an oversize permit. I call the other mode the "wide habitat" mode because in this position the container has an interior width of 12 feet 4 inches compared with about 7 feet 6 inches for a motor coach or travel trailer and about 9 feet 6 inches for a private railroad car. The transformation between modes doesn't require any physical or dimensional changes or any rearrangement of parts. The first mode is changed into the second mode and visa-versa by rotating the container back and forth 90 degrees about an axis which runs through the length of a lower long edge of the container.

This "mobile habitable container" has all the positive features of each type of portable habitat without any of the limitations. It allows people to live in "wide habitat" comfort on land or water. I moves on water as a boat and in the "highway trailer" mode can be safely towed at highway speeds behind a pickup truck without the need for an oversize permit.

OBJECTS

An important object is that in the "highway trailer" mode the container conforms to the legal height, width, length and weight limits for all roads. (Same dimensions as a semi-trailer.) When a destination is reached the legal highway height limit dimension (13 feet 6 inches in the U.S. in 1987) becomes the width dimension of the "wide habitat". The legal highway width limit dimension (8 feet 6 inches) in the U.S. in 1987) becomes the height dimension of the "wide habitat". This transformation is accomplished by rotating the "highway trailer" onto its side. Furniture is secured to prevent movement during towing and rotating. Appliances, machinery and plumbing are modified to function properly in this environment. Cabinets and drawers are latched so they won't spill their contents.

The rotating mechanism can be external or self contained. A preferred self-contained hydraulic method of rotation used on all models is illustrated and explained in the description section.

Another object is to provide a "highway trailer" with the interior heavy elements, such as the washing machine, stove, fireplace, generator, etc. arranged against the long wall containing the highway wheels. This asymmetrical arrangement provides for a designed low center of gravity near the highway wheels when the container in the "highway trailer" mode. This low center of gravity enables the container to be stable on its highway wheels. It also prevents the "highway trailer" from tipping over around corners or in strong crosswinds.

Another object is to provide a "highway trailer" that can be rotated onto its side and then launched at a lake access ramp. This is possible by making the container of watertight composite construction and providing auxiliary retractable launching wheels. The basic configuration is of a houseboat. The bottom is designed to provide extra flotation to the heavy side with the highway wheels so it will float level. The trailer turned houseboat can be kept at a marina, private dock, etc., and is more versatile as a recreational vehicle than a "land only" model. Buoyancy also makes flooding less of a problem. If the container is caught in high water it will float instead of being flooded and damaged like a conventional house trailer. The extra width possible with this system makes the trailer turned houseboat more confortable as a permanent habitat and provides the lateral stability needed in a boat.

Another object is to provide a "highway trailer" turned houseboat that is supported above the water on two foldable and extendable unequal size pontoons. These pontoons run the full length of each side of the container and provide still more width and lateral stability. The houseboat now becomes a catamaran and can handle more turbulent wave conditions at much higher speeds than the houseboat model. The pontoons add enough lateral stability to support a mast and sails for water propulsion. The pontoon on the heavy side with the highway wheels is the bigger of the two and extends deeper into the water to provide additional buoyancy to this heavy side which enables the catamaran to float level.

A further object is to provide a "highway trailer" that can be rotated onto its side, launched or not, and used on land or water with a plurality of extendable and retractable posts properly arranged and long enough to support and level the container on land or to support, level and raise the container above wave action in shallow water.

A final object is to provide a "mobile habitatable container" of watertight composite construction in the form of an elongated box (shoe box proportions) of one piece fiberglass (glass reinforced plastic) foam core construction. All edges and corners are of solid fiberglass laminate thick enough and wide enough to form an "angle iron" type outer frame structure. The sides and roof are of foam core construction to provide stiffness and to insulate against heat, cold and noise. The ceiling also has ceiling beams for added strength. The floor has joists in combination with the foam core construction. This type of one piece composite fiberglass structure is watertight, light weight, strong, extremely stiff and has built-in flotation in case of a marine accident. It can be mass produced in a reusable mold at low cost.

Other objects and advantages of the invention will become clear upon reading the detailed description and upon reference to the drawings.

DRAWING FIGURES

FIG. 7 is a rear end view of a houseboat model in the "highway trailer" mode.

FIG. 8 is a rear end view of a houseboat model in the water in the "wide habitat" mode.

FIG. 9 is a rear end view of a catamaran model in the "highway trailer" mode with its pontoons folded.

FIG. 10 is a rear end view of a catamaran model in the launched and in the water "wide habitat" mode with both pontoons extended.

FIG. 11 is a perspective view showing the "highway trailer" being transformed into the "wide habitat" by 90 degrees rotation. The structural shell of the container is shown in phantom lines so that the elements of the rotating mechanism can be seen.

FIG. 21 through 23 show how the pivot point support jack is used.

FIG. 24 shows a houseboat model in the water standing on its support/leveling posts above the wave action in shallow water.

FIG. 25 shows an auxiliary retractable launching wheel in the stowed travel position.

FIG. 26 shows an auxiliary retractable launching wheel in the deployed position ready to aid in launching at a lake access ramp.

FIG. 27 is section 29—29 through FIG. 4 which shows the preferred type of foam core construction of the outer structural shell of the container.

Figure 1:
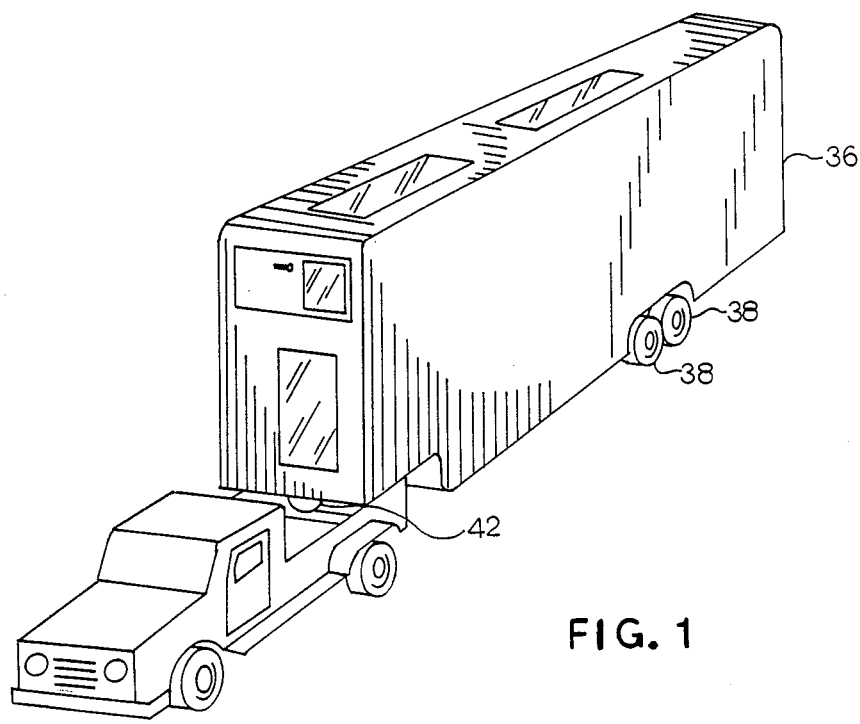
FIG. 1 is a perspective view showing the container on its highway wheels in the "highway trailer" mode being pulled on a roadway behind a pickup truck. (I am showing a "fifth wheel" type trailer throughout this application. Other configurations are of course possible.)

DRAWING REFERENCE NUMERALS 30 ground plane
32 lake bottom
34 water surface plane
36 outer structural shell of container
38 left side highway wheel
40 right side highway wheel
42 trailer hitch point
44 front container pivot point
46 rear container pivot point
48 support jack for 44
50 support jack for 46
52 rotating cylinder #52 (double acting front trunnion mounted)
54 cylinder rod for 52
56 pivot point for 52
58 control arm for 52
60 ground contact foot for 52
62 rotating cylinder #62 (double acting front trunnion mounted)
64 cylinder rod for 62
66 pivot point for 62
68 control arm for 62
70 ground contact foot for 62
72 common pivot point for 58 and 68
74 common support bulkhead for 56 and 66
76 large pontoon for heavy side of catamaran model
78 activation cylinder for 76 (double acting front trunnion mounted)
80 small pontoon for light side of catamaran model
82 activation cylinder for 80 (double acting front trunnion mounted)
84 designed center of gravity
86 common axis through 44, 46 and 72
88 plumb line through 84 and 86
90 living room
92 bathroom
94 kitchen
96 fireplace
98 utility room
100 bedroom
102 closet
104 solid fiberglass laminate edge
106 foam core area
108 combination floor joist and foam core area
110 ceiling beam
112 8 foot 6 inch long leveling/support post
114 auxiliary retractable launching wheel
116 mast and shrouds for catamaran model

DESCRIPTION

As a prelude to the description I want to explain why I am citing so many specific dimensions. Although the general rule is to avoid using specific dimensions in a description for fear of limiting the scope of the patent coverage, there are times when this practice cannot be avoided. My "mobile habitat container" invention is about obtaining the larges practical living space from teh legal highway height, width, and length dimension limits. It is an invention about dimensions and specific dimensions must necessarily be referred to in the interest of clarity.

Turning now to FIG. 1, there is disclosed a self contained "mobile habitable container" on edge on its highway wheels 38 being towed down a roadway behind a pickup truck. In this "highway trailer" mode the container conforms to the legal maximum height, width, length and weight dimensions for all highways in the U.S. It can be legally moved over any roadway without the need for an oversize permit.

The "fifth wheel" trailer shown is a "land use only" model. Two other models are described later that can be lived in equally well on both land and water. They are a houseboat model and a catamaran model. The preferred material for all models is of one piece composite fiberglass foam core construction and all models will float. The "land use only" model, however, will not float level because of the asymmetrical arrangement of interior elements which causes the design center of gravity to be near the side with the highway wheels for highway stability. The houseboat model also uses this unequal weight distribution for highway stability but its bottom is designed to provide additional flotation to the heavy side with the highway wheels so it will float level in the water. The catamaran model deals with this unequal weight distribution by having two different sized pontoons which is explained in more detail later. The special bottom designs of the floating models causes the loss of some interior headroom when they are in the "wide habitat" mode and these models are necessarily more costly to build.

Figure 2:
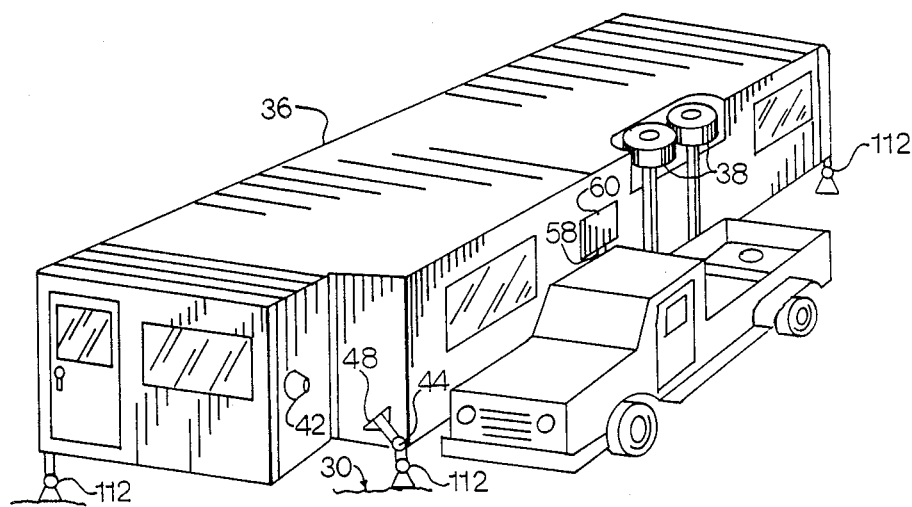
FIG. 2 is a perspective view showing the container at a destination in its "wide habitat" mode after it has been rotated onto its side and leveled with its leveling posts.

FIG. 2 shows a "land use only" model on its side in the "wide habitat mode". In this mode the "mobile habitatable container" provides up to 12 feet 4 inches of interior width, 8 feet of interior headroom and up to 48 feet of length which is the legal highway length limit in the U.S. in 1987. This amount of interior living space compares favorably with the room available in a 14 foot wide by 48 foot long house trailer but unlike a house trailer my "mobile habitable container" invention is not restricted in its mobility by its width. The total mobility possible with my system allows the container to be in a trailer park one day, at a ski resort the next day and in a marina on the third day. It provides enough "wide habitat" comfort for continued living and can be moved south for the winter or north for the summer in 2 days for the price of a few tanks of gas in the pickup truck.

Figure 3:
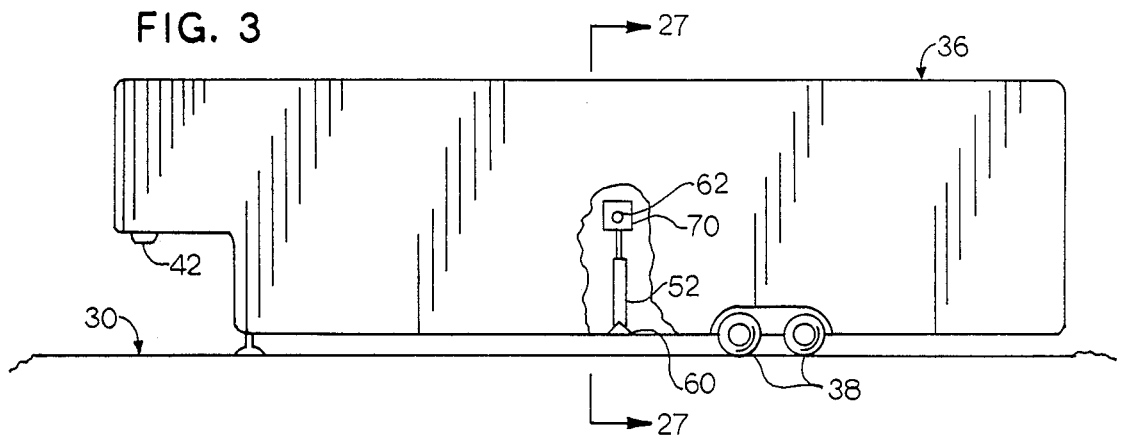
FIG. 3 is the highway side view of a "land use only" model in the "highway trailer" mode.

FIG. 3 is a side view of the container on edge on its highway wheels 38 in the "highway trailer" mode. This figure shows the maximum legal dimensions for height and length. It also shows the rotating cylinders 52 and 62 located equidistant from each end of the trailer. The proper fore and aft positioning of these cylinders is one critical factor that allows the rotating mechanism to function from a 3 point contact with the ground. More about rotating later.

Figure 4:
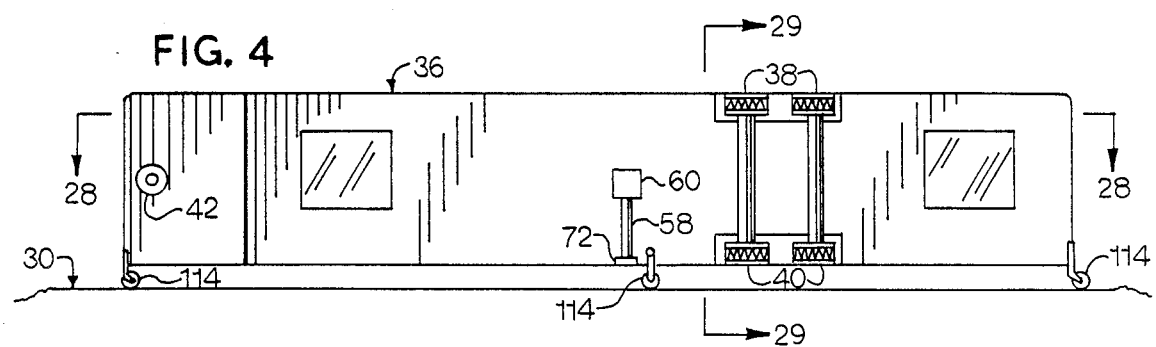
FIG. 4 is a side view of a "land use only" model on its side in the "wide habitat" mode.

FIG. 4 is a side view of the container on its side in the "wide habitat" mode. In this figure it is supported by its auxiliary retractable launching wheels 114. All models are provided with these wheels to aid in maneuvering into tight place in a trailer park or for launching at a lake access ramp. Note that the highway wheels 38, 40 remain attached to the container in this model. A wheel mounting system is available for easy wheel removal on special use models. Windows are shown in representative position for reference.

Figure 5:
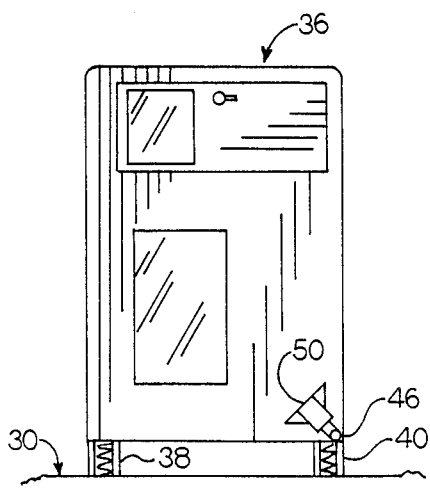
FIG. 5 is a rear end view of a land only model in the "highway trailer" mode.

FIG. 5 is a rear end view of a "land use only" model on edge on its highway wheels 38, 40 in the "highway trailer" mode. This figure illustrates the maximum legal width and height dimensions allowable without the need for an oversize permit. A door and window are shown in representative position for reference. The rear pivot point support jack 50 is in its stowed travel position. I am describing a trailer with one foot of ground clearance. I believe that this is the best compromise between ground clearance and "wide habitat" interior width. This is because the more ground clearance the "highway trailer" mode has the less interior width the "wide habitat" mode has and visa-versa. One foot of "highway trailer" ground clearance makes it possible to pull the container over snowy or muddy roads and pass harmlessly over road hazards while still allowing 12 feet 4 inches of interior width when the container is in the "wide habitat" mode.

Figure 6:
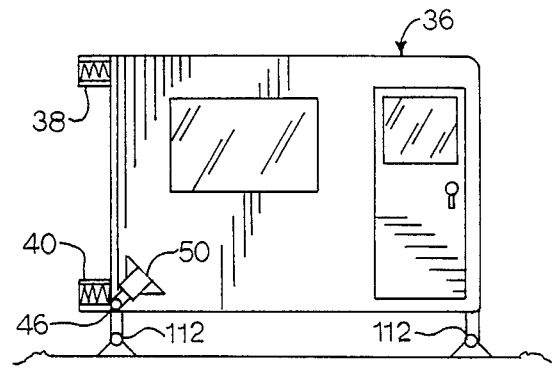
FIG. 6 is a rear end view of a land only model on its side in the "wide habitat" mode.

FIG. 6 is a rear end view showing the container on its side in the "wide habitat" mode. The height of the "highway trailer" has become the width of the "wide habitat". The width of the "highway trailer" has become the height of the "wide habitat". This is an important advantage of my invention. A door and window are shown in representative position for reference. FIG. 7 is a rear end view of a houseboat model on edge on its highway wheels 38, 40 in the "highway trailer" mode. The rear pivot point jack 50 is in the stowed travel position. A door and window are shown in representative position for reference.

FIG. 8 is a rear end view of a houseboat model in the water. Note how the bottom design provides additional buoyancy to the heavy side with the highway wheels 38, 40 which enables the houseboat to float level. A door and window are shown in representative position for reference.

FIG. 9 is a rear end view of a catamaran model on edge on its highway wheels 38, 40 in the "highway trailer" mode. In this mode the pontoons 76, 80 are folded to conform to the legal highway height and width dimension limits. Note the position of the pontoon activation cylinders 78 and 82. A door and window are shown in representative position for reference.

FIG. 10 shows a catamaran model in the water in its "wide habitat" mode. The additional width and added lateral stability available when the pontoons are deployed allows a mast 116 and sails to be added for water propulsion. The heavy side pontoon 76 is the bigger of the two pontoons and is designed to extend deeper into the water and provide the extra buoyancy needed to enable the catamaran to float level. These two pontoons extend the full length of the catamaran on both sides and raise it out of the water. This allows the catamaran model to negotiate more turbulent waters at much higher speeds than the houseboat model. Note the positions of the pontoon activation cylinders 78 and 82. A door and window are shown in representative position for reference.

FIGS. 11 through 17 demonstrate how the self contained rotating system works. This is the hydraulic system of preference that is used on all models.

Figure 14:
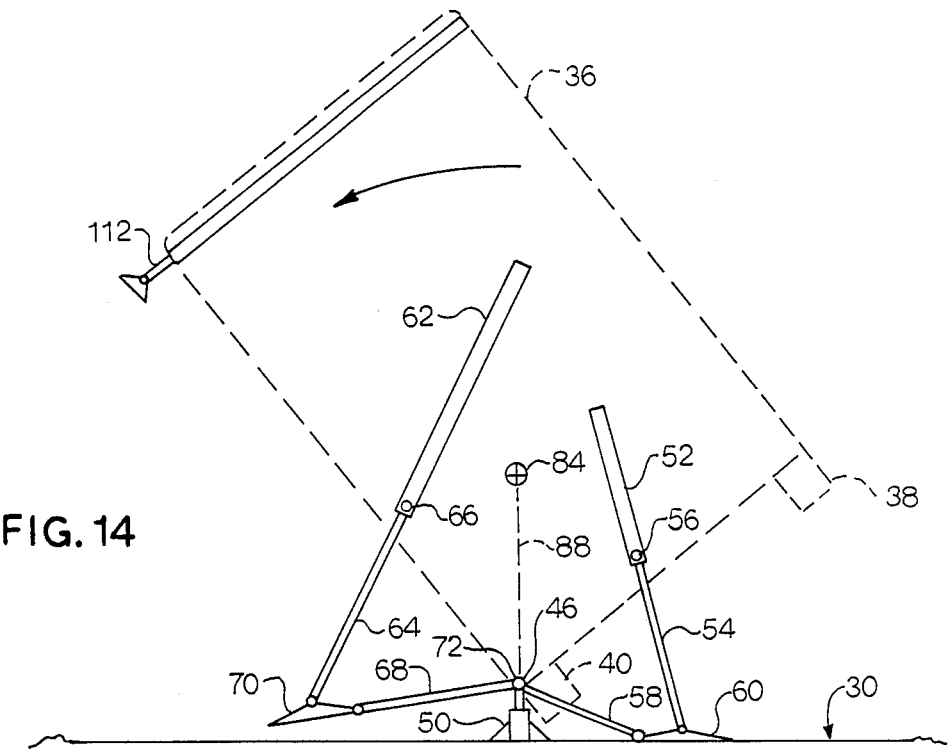

FIG. 11 is a perspective view showing the "highway trailer" being turned into the "wide habitat" by 90 degree rotation about axis 86—86. (FIG. 11 and FIG. 14 show the container at the same stage of rotation.) The container shell 36 is shown in phantom lines so that the elements of the rotating mechanism can be revealed. A door and windows are shown in representative position for reference. The factors which make this simple rotating system work are:

A. A rigid container outer shell 36.
B. A rotating cylinder pivot point support bulkhead 74, to spread the force of the rotating cylinders 52,62 to the container outer shell 36.
C. A front container pivot point 44 located at the front lower right hand corner of the container.
D. A rear container pivot point 46 located at the rear lower right hand corner of the container.
E. Jacks 48, 50 for the front and rear container pivot points 44, 46 to raise and support the right hand side of the container which also raises the right hand side highway wheels 40 off the ground.
F. An axis 86—86 running the length of the container along the bottom right hand edge that is common to the rear container pivot point 46, the front container pivot point 44, and the pivot point for both rotating cylinder control arms 72.
G. A designed center of gravity 84 so positioned to cause the container to remain stable on a three point contact with the ground throughout the rotating function. Two of the three point contacts with the ground are always the front and rear jacks 48, 50 that support the front and rear pivot points 44, 46. The third point contact with the ground is either the cylinder foot 60 or the cylinder foot 70 depending on which side of the axis 86—86 the designed center of gravity 84 is during the rotating process. The designed center of gravity 84 projected onto the ground always falls inside the triangle on the ground formed by the three point contact of 48, 50, 60, or by the three point contact of 48, 50, 70, except when it passes over the axis 86—86. At this point it is theoretically perfectly balanced and can therefore be supported by a 2 point contact 48, 50 with the ground.
H. A hydraulic pumping unit (not shown) to provide hydraulic power to the rotating cylinders 52, 62.
I. Cylinder foot control arms 58, 68 for the rotating cylinders 52, 62.
J. Ground contact feet 60, 70 for the rotating cylinders 52, 62.

FIGS. 12 through 17 show section 27—27 through FIG. 3 looking rearward past the rotating cylinders and related mechanism.

Figure 12:
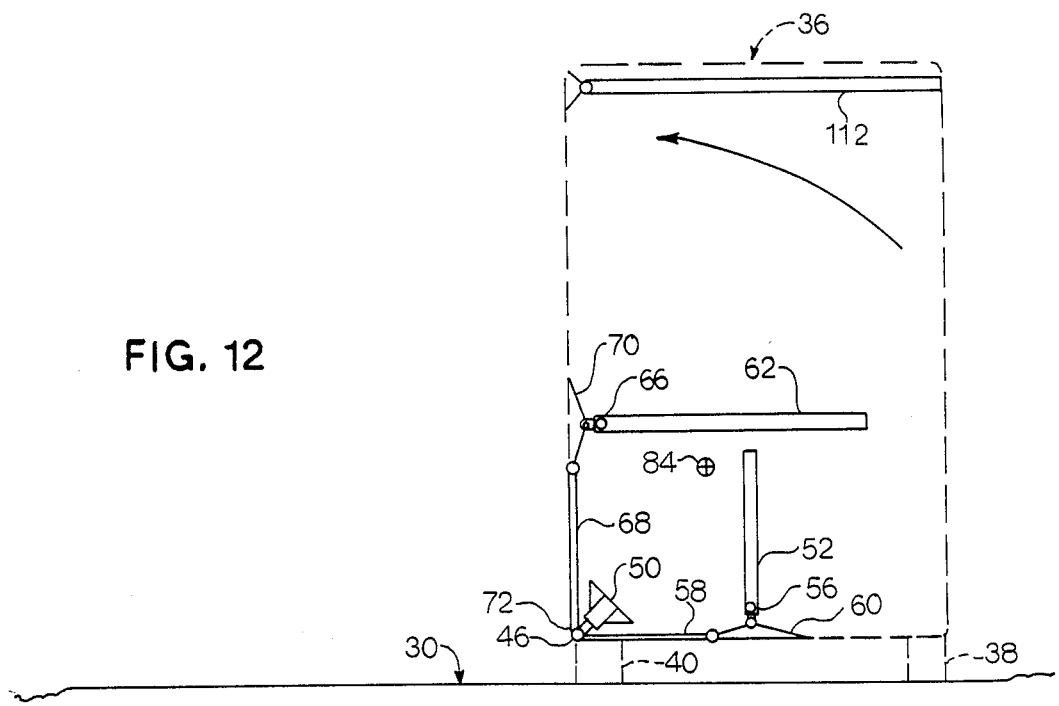
FIGS. 12 through 17 show section 27—27 through FIG. 3 of a land use only model rotating from the "highway trailer" mode into the "wide habitat" mode.

FIG. 12 shows the container at a destination in its "highway trailer" mode with all the rotating mechanism in the stowed travel position.

Figure 13:
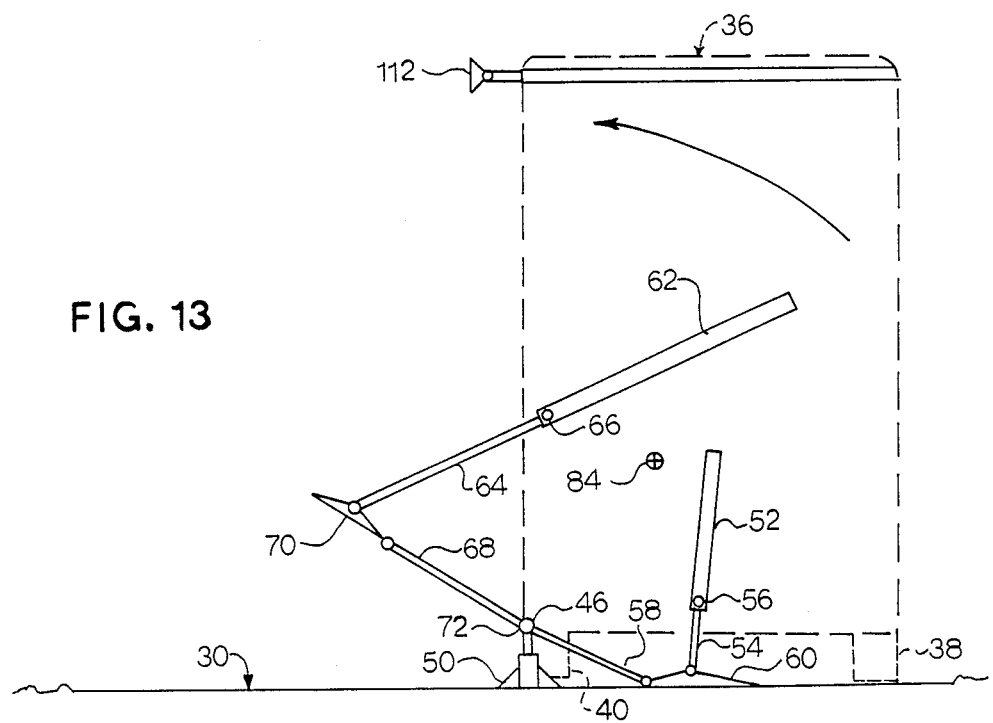

FIG. 13 shows the first step in the rotating process. This involves the container making its three point contact with the ground. The first two ground contact points are made when the front and rear container pivot points 44, 46 are raised up by their respective jacks 48, 50 which also causes the right hand side highway wheels 40 to clear the ground. The rotating cylinder 52 has been activated which causes its cylinder foot 60 to engage the ground completing the third contact point with the ground for the rotating process. The point on the ground where cylinder foot 60 makes its contact cannot change throughout the rotating function because it is held stationary by its control arm 58. Rotating cylinder 62 has also been activated to position its foot 70 so it will contact the ground just after the container passes its balance point and starts to fall over on its side. Two of the 8 foot 6 inch long leveling posts 112 have been extended just far enough to support and level the container when it is fully on its side.

FIG. 14 shows how the container has been pushed up by the hydraulic force of rotating cylinder 52. The container has rotated about the front and rear pivot point axis 86—86 which also passes through the control arm pivot point 72. It is shown at its balance point where the rotating process is transferred from rotating cylinder 52 to rotating cylinder 62 (or visa-versa depending on whether the "highway trailer" is being turned into the "wide habitat" or whether the "wide habitat" is being turned into the "highway trailer"). Note that the design center of gravity 84 lies on the plumb line 88 through the common front and rear pivot point axis 86—86 just before the container starts to fall over on its side. The foot 70 of rotating cylinder 62 is positioned to catch the container just after it starts to fall. (The distance from foot 70 to the ground is slightly exaggerated for clarity.) The position of the container in this figure is equal to the position of the container in perspective FIG. 11. The container still maintains a stable three point contact with the ground. (Refer back to the description of FIG. 12.)

Figure 15:
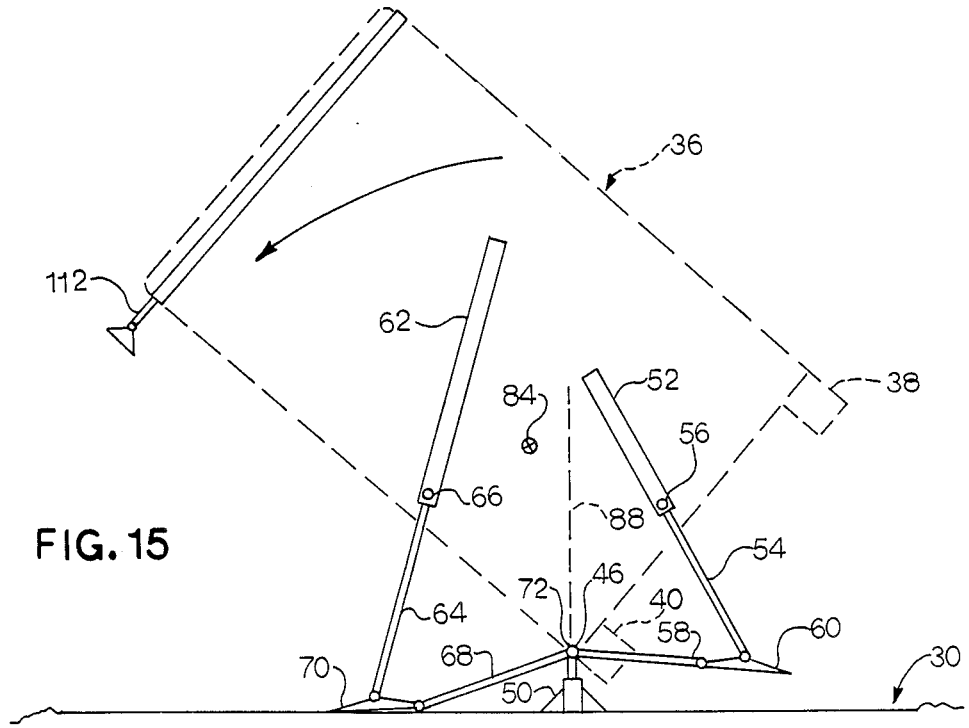

FIG. 15 shows the container after its design center of gravity 84 has passed over the axis 86—86 through the front and rear pivot points 44, 46 and started to fall over on its side. The foot 60 of rotating cylinder 52 which was the third contact point with the ground has been replaced by the foot 70 of rotating cylinder 62 as the new third point contact with the ground. The rotating process has transferred from the pushing up action of rotation cylinder 52 to the lowering down action of cylinder 62. The container is still making a stable three point contact with the ground. (Refer back to the description of FIG. 12.)

Figure 16:
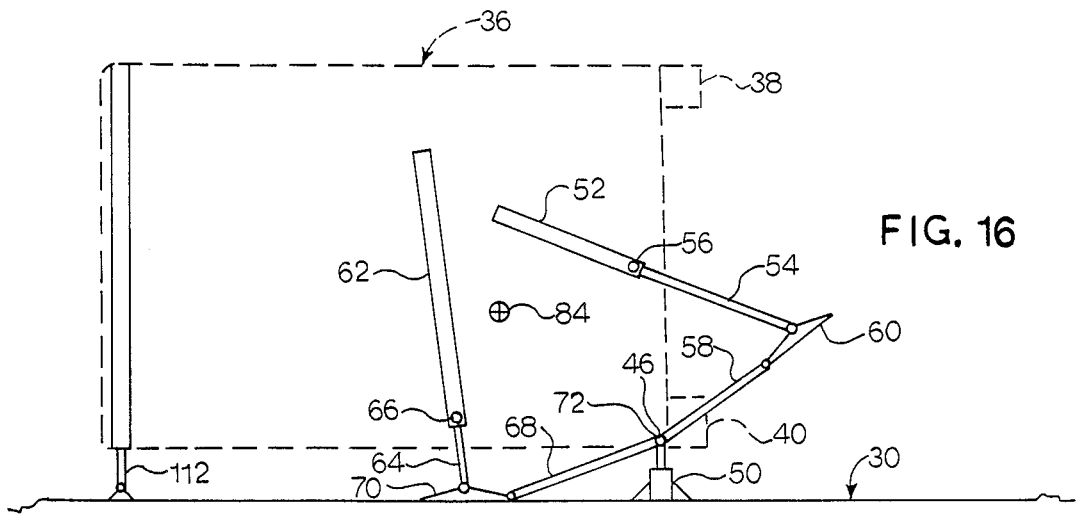

FIG. 16 shows the container fully lowered onto its side by rotating cylinder 62. The leveling posts 112 have contacted the ground and are ready to assume the support/leveling function. If this container was a houseboat or catamaran model at a lake access ramp waiting to be launched it would now be supported by its auxiliary retractable launching wheels 114 as shown in FIG. 4.

Figure 17:
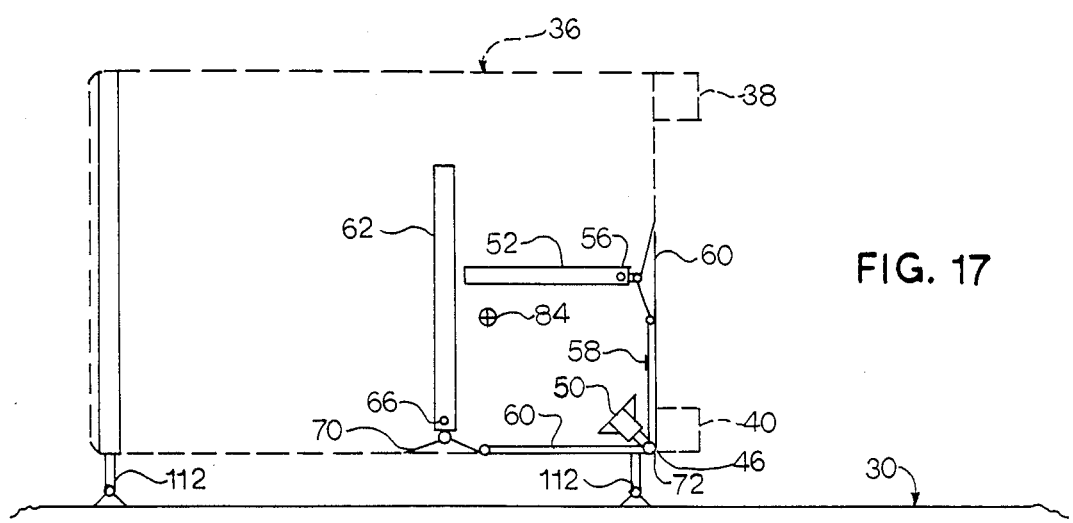

FIG. 17 shows the container fully on its side in the "wide habitat" mode being supported by its leveling posts 112. All the rotating mechanism has been retracted back into the stowed position. To put the container back on edge on its highway wheels 38, 40 and turn it back into a "highway trailer" simply reverse the rotating process.

Figure 18:
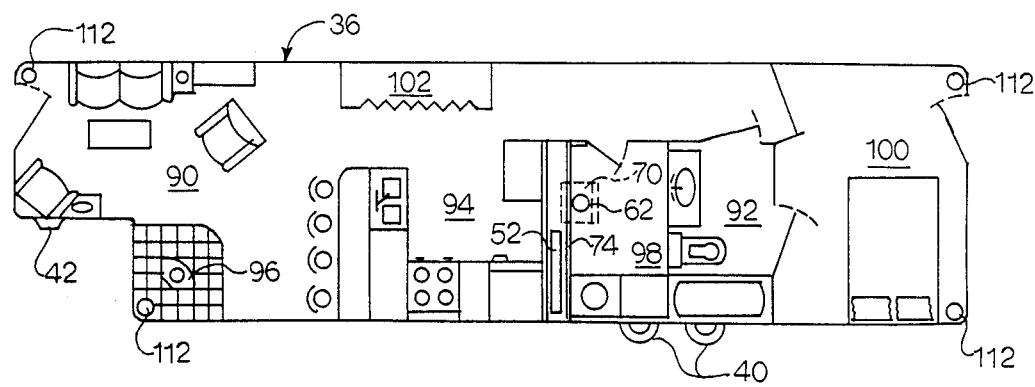
FIG. 18 is section 28—28 through FIG. 4 illustrating a possible interior layout with most heavy elements arranged against the long wall with the highway wheels.

FIG. 18 is section 28—28 through FIG. 4 where the container is in its "wide habitat" mode. This figure illustrates a possible interior layout with most heavy interior elements against the long wall with the highway wheels. This interior layout results in the asymmetrical design center of gravity 84 which is necessary both for the operation of the rotating process and to provide a low center of gravity when the container is on its highway wheels in the "highway trailer" mode. Note the position of the rotating cylinder pivot point bulkhead 74.

Figures 19, 20:
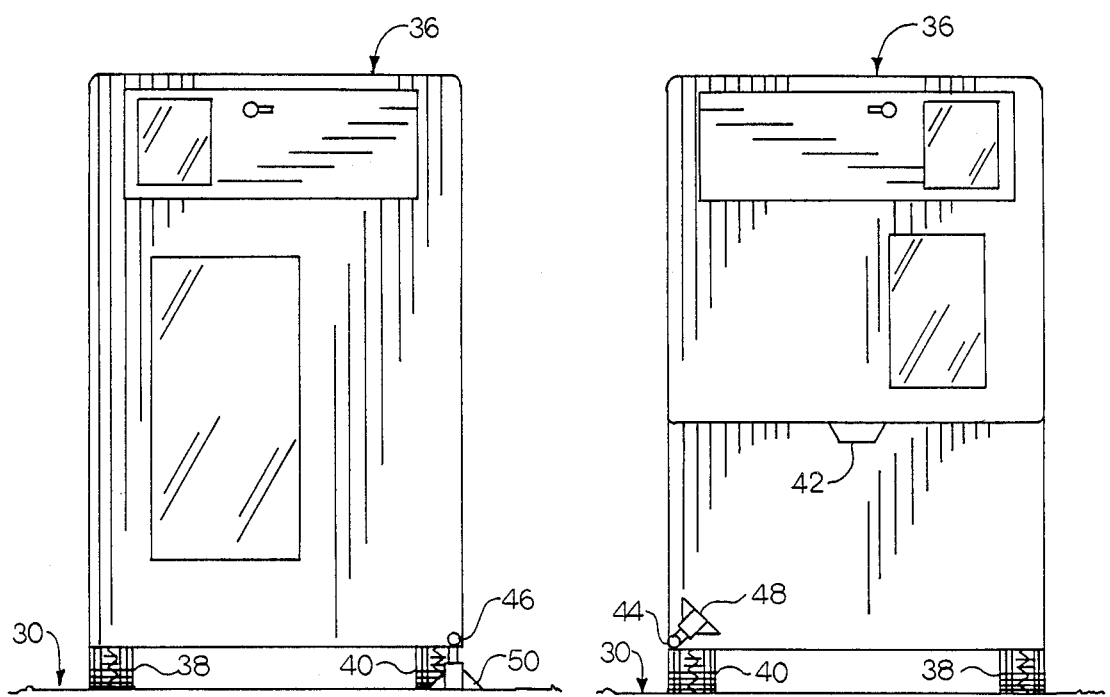
FIG. 19 is a rear end view of a land use only model in the "highway trailer" mode showing the rear pivot point support jack deployed and ready for the rotating function.
FIG. 20 is a front end view of a land use only model in the "highway trailer" mode with the front pivot point support jack in the stowed and ready for travel position.

FIG. 19 is a rear end view of a land use only model in the "highway trailer" mode. It shows the rear pivot point jack 50 at the rear of the R. H. lower edge of the container deployed and contacting the ground ready to raise the R.H. side of the container off the ground.

FIG. 20 is a front end view of a land use only model in the "highway trailer" mode. It shows the front pivot point support jack 48 stowed and in the travel mode. Note that it is at the front R.H. lower edge of the container.

FIG. 21 is a rear end view of a land use only model in the "highway trailer" mode. It shows the rear pivot point jack 50 at the rear of the R.H. lower edge of the container in the stowed travel position.

FIG. 22 is a rear end view of a land use only model in the "highway trailer" mode. It shows the rear pivot point jack 50 at the rear of the R.H. lower edge of the container deployed, ready to contact the ground and raise the R.H. side of the container off the ground.

FIG. 23 is a rear end view of a land use only model in the "highway trailer" mode. It shows how the rear pivot point jack 50 at the rear of the lower R.H. edge of the container has raised and supported the R.H. side of the container enough so that the R.H. side highway wheels 4 are clear of the ground 30.

FIG. 24 shows a houseboat model in the water in the "wide habitat" mode. It is being supported and leveled above the wave action in shallow water by its 8 foot 6 inch long leveling posts 112.

FIG. 25 shows an auxiliary retractable launching wheel 114 in the stowed, out of the way inoperable position. All models have these wheels to be used in the "wide habitat" mode for maneuvering into tight places in a trailer park or to aid in launching at a lake access ramp.

FIG. 26 shows an auxiliary launching wheel 114 deployed and ready to aid in maneuvering or launching.

FIG. 27 shows section 29—29 through FIG. 4. It illustrates the preferred one piece watertight composite fiberglass foam core construction. This type of structure is referred to as "skin loaded" because the large flat surfaces provide most of the strength. The structural support of house trailers, travel trailers and motor coaches is made up of rectangular structural steel tubes arranged under the main body. These beams are small because the space they take up is space that cannot be used as living space. This small size makes them flexible as anyone who has jumped up and down inside a house trailer knows. A house trailer is like a trampoline inside. The supporting structure of my "mobile habitable container" invention is a single structural tube of rectangular cross section 12 feet 6 inches wide, 8 feet 6 inches high and up to 48 feet long with closed ends and integral interior bulkheads. The living accommodations are built inside this tube. The occupants actually live inside the single structural member. The only living space used up by the support structure in this system is the thickness of the walls of the single large beam which are only one inch thick in most places.

The edges and corners of the container are of solid fiberglass laminate 104 thick enough and wide enough to form an "angle iron" type outer frame structure. The sides and roof are of foam core construction 106 to provide stiffness and light weight and to insulate against heat, cold and noise. The ceiling also has ceiling beams 110 for added strength. The floor has joists in combination with the foam core construction 108 to provide the additional stiffness to support furniture and people. This type of one pice composite foam core fiberglass structure is watertight, light weight, strong, extremely stiff and has built-in flotation in case of a marine accident. It can be mass produced in a reusable mold at low cost.

The one inch foam core thickness of the walls gives them stiffness and provides good insulation against heat and cold. This is enough insulation for the standard model because it will usually be used in the north in the summer and south in the winter. Thicker walls are available for models that are to be used in more extreme environments.

USES AND ADVANTAGES

Uses and advantages of this type of habitat are many and varied.

It is the only available mobile habitat that can provide 12 feet 4 inches of interior width for comfortable permanent or temporary habitation and still be easily moved at highway speeds without the need for an oversize permit. It is also the only available mobile habitat that is designed to function equally well on both land and water. It will float if unexpectedly caught in high water. It can be quickly and easily moved out of the path of a hurricane in Florida or a forest fire in California. It can be moved from a canal in Fort Lauderdale to a ski resort in Colorado in two days without the need for an oversize permit.

Possible uses besides housing for people who want a portable, permanent or temporary place to live on land or water are:

A. Red Cross blood mobile
B. Construction housing
C. Personnel quarters at a remote movie set
D. Shelter for explorers, naturalists and scientists
E. Portable industrial displays
F. Emergency temporary housing
G. Emergency portable hospitals
H. Affordable housing for the homelss in America
J. Affordable manufactured housing for third world nations While the invention has been described in connection with a preferred embodiment, it will be understood that I do not intend to be limited to the particular embodiment shown but intend, on the contrary, to cover the various alternative and equivalent constructions included within the spirit and scope of the appended claims.

I claim as my invention:

1. A mobile habitable container, said container to be functional in two mutually exclusive modes, the transformation between said modes requiring 90 degree rotation about an axis parallel to a longitudinal axis of said container comprising:
   A. A set of highway wheels attached to one long side whose dimensions are less than or equal to maximum legal highway width X length;
   B. A highway trailer mode as one of said two mutually exclusively modes conforming to all dimensional and weight limit restrictions for legal use on U.S. Highways without the need for an oversize permit;
   C. A habitat mode as the other of said two mutually exclusive modes, in which a wide habitat width dimension is less than or equal to the maximum legal highway height dimension, in which said wide habitat's height dimension is less than or equal to the maximum legal highway width dimension and in which said wide habitat's length dimension is less than or equal to the maximum legal highway length dimension;

D. Means for rotating said container back and forth 90 degrees about an axis parallel to a longitudinal axis of said container the purpose of said 90 degree rotation to be to change back and forth between two said mutually exclusive modes; and E. A composite outer shell for said container to be watertight and buoyant.

2. The mobile habitable container of claim 1 wherein said composite outer shell is one piece and is of fiberglass foam core construction.

3. The mobile habitable container of claim 2 with auxiliary retractable launching wheels to be used when said container is in said "wide habitat" mode.

4. The mobile habitable container of claim 3 in which when in said wide habitat mode, said container may assume a houseboat configuration, said houseboat configuration to have a heavy side which is said one long side, and to have a bottom so designed to provide extra buoyancy to the heavy side with the highway wheels of said container to enable said container to float level.

5. The mobile habitable container of claim 1 with two unequal size foldable and extendable pontoons, said container having an opposing side opposite said heavy side, said pontoons extending the full length of each of said opposing side and said heavy side of said container, said pontoons to have the function of supporting said container above the water.

6. The mobile habitable container of claim 5 having a larger one of said two pontoons supporting the heavy side of said mobile habitable container with the highway wheels of said container to enable said container to float level.

7. The mobile habitable container of claim 1 with a plurality of extendable and retractable posts equal in length to the height of said container when said container is positioned in the mode the function of said posts being to support and level said container on land and to support, level and raise said container above wave action in shallow water.

8. The mobile habitable container of claim 1 having a support structure consisting of a single structural tube of rectangular cross section said tube to have a height dimension less than or equal to the maximum legal highway width dimension and a width dimension less than or equal to the legal highway height dimension and a length dimension less than or equal to the legal highway length dimension.

9. The mobile habitable container of claim 8 having living accommodations built inside the single structural tube of rectangular cross section, said tube to comprise the sole structural member of said container.

10. The mobile habitable container of claim 8 wherein said set of highway wheels is attached permanently.

11. The mobile habitable container of claim 8 wherein said set of highway wheels is attached removably.

12. The mobile habitable container of claim 9 wherein said set of highway wheels is attached permanently.

13. The mobile habitable container of claim 9 wherein said set of highway wheels is attached removably.

14. The mobile habitable container of claim 1 having an asymmetrical interior positioning of furniture, appliances and machinery arranged along said long side containing said highway wheels the result of said asymmetrical positioning to be a design center of gravity which lies as close as practical to said highway wheels.

15. The mobile habitable container of claim 1, wherein interior elements of said mobile habitable container are secured to prevent said interior elements from moving during said 90 degree rotation or during highway travel.

16. The mobile habitable container of claim 1 wherein said set of highway wheels is attached permanently.

17. The mobile habitable container of claim 1 wherein said set of highway wheels is attached removably.

18. A houseboat, said houseboat to be functional in two mutually exclusive modes, the transformation between said modes requiring 90 degree rotation about an axis parallel to a longitudinal axis of said houseboat comprising:

A. A set of highway wheels attached to a first long side of said houseboat, the dimensions of said first long side to be less than or equal to legal highway width for said first long side width dimension and less than or equal to legal highway length for said first long side length dimension;

B. A wide habitat mode as one of said two mutually exclusive modes, in which the overall width of said houseboat including said highway wheels shall be equal to ore less than the legal highway height dimension and in which the overall height of said houseboat including the bottom which is below the water surface shall be equal to or less than the legal highway width dimension and in which the length of said houseboat shall be equal to or less than the legal highway length limit;

C. And a highway trailer mode as the other of said two mutually exclusive modes of said houseboat when said houseboat is on its highway wheels in which the overall dimensions of height, width, length and weight of said houseboat are less than or equal to the legal highway height, width, length and weight dimension limits;

D. Means for rotating said houseboat back and forth 90 degrees about an axis parallel to the longitudinal axis of said houseboat, the purpose of said 90 degrees rotation being to change back and forth between said two mutually exclusive modes.

19. The houseboat of claim 18 having an asymmetrical interior positioning of furniture, appliances and machinery arranged along said long side containing said highway wheels, the result of said asymmetrical positioning to be a design center of gravity which lies as close as practical to said highway wheels.

20. The houseboat of claim 19 having a bottom so designed as to provide extra buoyancy to said first long side with said highway wheels which is near said center of gravity to enable said houseboat to float level.

21. The houseboat of claim 18 with a one piece outer shell made of composite fiberglass foam core construction, said outer shell to be watertight and buoyant.

22. The houseboat of claim 18 with auxiliary retractable launching wheels, the purpose of said wheels to be to aid in moving said houseboat in and out of the water at a lake access ramp.

23. The houseboat of claim 18 having two unequal size foldable and extandable pontoons extending the full length of said houseboat, the purpose of said pontoons being to support said houseboat above the water surface and to turn said houseboat into a catamaran.

24. The houseboat of claim 23 having a larger one of said two unequal size pontoons attached to the said first long side with the said highway wheels, said larger pontoon to extend deeper into the water to provide additional buoyancy to said first long side to enable said houseboat to float level.

25. The houseboat of claim 18 having a plurality of extendable and retractable posts said posts to be equal in length to the overall height of said houseboat when said houseboat is in the water in said houseboats wide habitat mode, the purpose of said posts to be to support and level said houseboat on land and to support, level and raise said houseboat above wave action in shallow water.

26. The houseboat of claim 18, said houseboat to have a support structure consisting of single structural tube of rectangular cross section; said tube, when in the wide habitat mode, to have a height less than or equal to the maximum legal highway width dimension and to have a width dimension less than or equal to the legal highway height dimension and to have a length dimension less than or equal to the maximum legal highway length dimension.

27. The houseboat of claim 26 having all living accommodations built inside said single structural tube, said tube to comprise the sole structural member of said houseboat.

28. The houseboat of claim 27 wherein said set of highway wheels is attached permanently.

29. The houseboat of claim 27 wherein said set of highway wheels is attached removably.

30. The houseboat of claim 18, wherein interior elements of said mobile habitable container are secured to prevent said interior elements from moving during said 90 degree rotation or during highway travel.

31. The houseboat of claim 30 wherein said set of highway wheels is attached permanently.

32. The houseboat of claim 30 wherein said set of highway wheels is attached removably.

33. The houseboat of claim 18 wherein said set of highway wheels is attached permanently.

34. The houseboat of claim 18 wherein said set of highway wheels is attached removably.

* * * * *